United States Patent [19]

Li

[11] 4,100,226
[45] Jul. 11, 1978

[54] INDENE-CHLOROBUTYL RUBBER COPOLYMERS

[75] Inventor: George S. Li, Aurora, Ohio

[73] Assignee: The Standard Oil Company, Cleveland, Ohio

[21] Appl. No.: 753,919

[22] Filed: Dec. 23, 1976

[51] Int. Cl.$^2$ ............................................. C08F 279/02
[52] U.S. Cl. .................................................... 260/879
[58] Field of Search ............................ 260/879, 880 R

[56] References Cited

U.S. PATENT DOCUMENTS

| | | | |
|---|---|---|---|
| 3,904,708 | 9/1975 | Kennedy | 260/879 |
| 3,947,527 | 3/1976 | Li | 260/879 |
| 3,954,911 | 5/1976 | Johnson | 260/879 |

OTHER PUBLICATIONS

Chemical Abstracts, 85: 64450, Sigwalt, 1976.

*Primary Examiner*—Paul R. Michl
*Attorney, Agent, or Firm*—John F. Jones; Larry W. Evans

[57] ABSTRACT

Graft polymers of indene onto chlorobutyl rubber which have good impact resistance and high heat-distortion temperatures and blends of these graft polymers with commercially available thermoplastic resins are described.

9 Claims, No Drawings

INDENE-CHLOROBUTYL RUBBER COPOLYMERS

This invention relates to polymers prepared by polymerization of indene in the presence of a chlorinated copolymer of isobutylene and isoprene and more particularly pertains to impact-resistant, high heat-distortion temperature graft polymers of indene and chlorinated butyl rubber, to a method for producing these graft polymers and to blends of these graft polymers with commercially available thermoplastic resins.

Grafted elastomers composed of a major proportion of rubber and a minor proportion of indene have been proposed by Sigwalt et al. In *Chemical Abstracts*, Vol. 85, 64450i, 1976, Sigwalt et al describe thermoplastic elastomers which are manufactured by grafting indene or its mixtures with styrene or alpha-methyl styrene onto chlorinated butyl rubber. A typical thermoplastic elastomer of this type contained 60% chlorinated butyl rubber and 40% grafted indene and was elastomeric with usually associated low heat-distortion temperature. Sigwalt et al also have disclosed in *Chemical Abstracts*, Vol. 85, 78930c, 1976, graft copolymers of indene and non-halogenated butyl rubber, ethylene-propylene-diene rubber or polybutadiene. Again, the graft polymers were prepared with a major proportion of the rubber component and a minor proportion of indene and they were characterized as elastomers with very low heat-distortion temperatures. For other disclosures of this type, see also West German Pat. Publications Nos. 2,550,717 and 2,551,558 and Belgian Pat. No. 835,577.

I have discovered that graft polymers prepared by the polymerization of at least 60% by weight of indene with no more than 40% by weight of a chlorinated rubbery copolymer of isobutylene and isoprene are thermoplastic and have unexpectedly high heat-distortion temperatures and excellent impact resistance. The graft polymers of my invention are superior in properties to physical blends of polyindene and chlorinated butyl rubber and graft polymers prepared from a minor proportion of indene and a major proportion of chlorinated butyl rubber of the type described by Sigwalt et al. The preferred thermoplastic resins of my invention are prepared by polymerizing from 60 to 95% by weight of indene in the presence of from 5 to 40% by weight of a chlorinated rubbery copolymer of isobutylene and isoprene.

The chlorinated rubbery copolymer of isobutylene and isoprene can be prepared by lightly chlorinating a copolymer of isobutylene and isoprene, commonly known as butyl rubber. The rubbery copolymer of isobutylene and isoprene is made up of from 95 to 99% by weight of isobutylene and from 1 to 5% by weight of isoprene. The chlorinated butyl rubber useful in this invention contains from 0.1 to 5% by weight of chlorine based on the weight of the rubber.

The graft polymers of this invention are preferably prepared by polymerizing a mixture of indene and chlorinated butyl rubber in the presence of an acid catalyst. Preferred acid catalysts in the process of my invention include $AlR_xCl_{3-x}$ where R equals $CH_3$, $C_2H_5$, $nC_3H_7$ or $i$-$C_3H_7$ and $x$ equals 0–3, $TiCl_4$ or $BF_3$.

It is also preferred that the graft polymerization process of this invention be carried out in the presence of a diluent such as mixtures of a hydrocarbon and a halogenated hydrocarbon such as n-pentane and methylene chloride.

The graft polymers of this invention are useful thermoplastic resins for fabrication of films, sheets, laminates, bottles and other types of containers for liquids and solids and they can also be blended with many types of well known resins such as polyindene, modified and unmodified polystyrene, styrene and indene block copolymers, polycarbonates and polyaromatic ethers for improvement in properties including heat resistance, impact resistance, strength, moldability, handling characteristics and orientability.

This invention is further illustrated in the following examples wherein the amounts of ingredients are expressed in parts by weight unless otherwise specified.

EXAMPLE 1

A polymerization mixture was made of 87 parts of indene and 13 parts of chlorobutyl rubber (which was a copolymer of isobutylene and isoprene containing from 1 to 3% by weight of polymerized isoprene and the remainder polymerized isobutylene which rubber contained about 1.2% bound chlorine) in 1150 parts of methylene chloride and 1000 parts of n-pentane. The resulting solution was cooled to −70° C and was maintained at this temperature with stirring under a nitrogen atmosphere. A 5% solution of 9.7 parts of diethyl aluminum chloride in toluene was introduced into the stirred, cooled reaction mixture over a period of 30 minutes. A total reaction time of 30 minutes was employed. The solid contents of the reaction mixture were isolated by coagulation with acetone and were dried at 50° C in a vacuum oven for 24 hours. The resulting resin was found to have the following properties:

| | |
|---|---|
| ASTM heat-distortion temperature | 96° C (264 psi) |
| flexural strength | $3.1 \times 10^3$ psi |
| flexural modulus | $0.66 \times 10^5$ psi |
| notched Izod impact strength | 3.7 foot pounds per inch of notch |
| shore "D" hardness | 63 |
| tensile strength | $2.01 \times 10^3$ psi |

A compression molded film of this resin (230° C, 4000 psi, 20 mils thick) was found to be clear and tough having a light transmission of 85%.

EXAMPLE 2

According to the procedure of Example 1, a polymerization mixture of 75 parts of indene and 25 parts of chlorobutyl rubber in 1580 parts of methylene chloride and 750 parts of n-pentane was cooled to −60° C and maintained under a nitrogen atmosphere with stirring while a 5% solution of 2.4 parts of diethyl aluminum chloride in toluene was introduced into the reaction mixture over a period of 9 minutes. A total reaction time of 10 minutes was employed. The contents of the reactor were treated with acetone and the coagulated polymer was dried. The resulting resin was found to have the following properties:

| | |
|---|---|
| ASTM heat-distortion temperature | 76° C |
| vicat softening temperature | 162° C |
| flexural strength | $2.12 \times 10^3$ psi |
| flexural modulus | $0.45 \times 10^5$ psi |
| notched Izod impact strength | 13 foot pounds per inch of notch |
| shore "D" hardness | 60 |
| tensile strength | $1.78 \times 10^3$ psi |

A compression molded film (230° C, 4000 psi, 20 mils thick) from this resin was clear and tough.

EXAMPLE 3

A. A polymerization mixture was made up of 65 parts of indene and 35 parts of chlorobutyl rubber in 1272 parts of methylene chloride and 1192 parts of n-pentane. This mixture was cooled to −60° C and was maintained with stirring under a nitrogen atmosphere. A 5% solution of 1.94 parts of diethyl aluminum chloride in toluene was introduced into the polymerization mixture during a 9-minute period. A reaction time of 10 minutes was employed. The polymer was isolated and dried after coagulation with acetone. The resulting resin was found to have the following properties:

| | |
|---|---|
| vicat softening temperature | 157° C |
| flexural strength | $1.6 \times 10^3$ psi |
| flexural modulus | $0.341 \times 10^5$ psi |
| shore "D" hardness | 48 |

B. The experiment described in A of this example was repeated using 60 parts of indene and 40 parts of chlorobutyl rubber. The resulting resin was found to have the following properties:

| | |
|---|---|
| vicat softening temperature | 147° C |
| flexural strength | $1.26 \times 10^3$ psi |
| flexural modulus | $0.2 \times 10^5$ psi |
| shore "D" hardness | 46 |

C. The experiment described in A of this example was repeated using 56 parts of indene and 44 parts of chlorobutyl rubber. The resulting polymer which is outside the scope of this invention was found to have the following properties:

| | |
|---|---|
| vicat softening temperature | 99° C |
| flexural strength | $0.2 \times 10^3$ psi |
| flexural modulus | $0.023 \times 10^5$ psi |
| shore "D" hardness | 28 |

EXAMPLE 4

A polymer which is outside the scope of this invention was prepared by mixing 75 parts of polyindene and 25 parts of chlorobutyl rubber in boiling toluene. The resulting polymer was isolated by precipitation with acetone. The dried polymer was pressed into a film (230° C, 4000 psi) which was found to be opaque, brittle and to have poor strength.

EXAMPLE 5

A polymer which is outside the scope of this invention was prepared according to German Pat. No. 2,550,717 using $9.5 \times 10^{-4}$ mole per liter of diethyl aluminum chloride, 0.220 mole per liter of indene and 20 grams per liter of chlorobutyl rubber in a 1:1 volume mixture of methylene dichloride:methyl cyclohexane and a temperature of −50° C. The resulting polymer was found to have the following properties:

| | |
|---|---|
| ASTM heat-distortion temperature | <25° C |
| vicat softening temperature | 25° C |
| flexural modulus | $0.0425 \times 10^5$ psi |
| shore "D" hardness | 15 |

EXAMPLE 6

The resin described in Example 3B was employed in the following experiments.

A. A solution was prepared of 50 parts of the resin described in Example 3B and 50 parts of commercially available poly(2,6-dimethyl-p-phenylene oxide) in methylene chloride. The solid mixture resulting was precipitated with methanol and the solid was dried at 50° C under vacuum for 24 hours. The resulting polymer mixture was found to have the following properties:

| | |
|---|---|
| ASTM heat-distortion temperature | 160° C |
| notched Izod impact strength | 5.0 foot pounds per inch of notch |

In comparison, the poly(2,6-dimethyl-p-phenylene oxide) was found to have an ASTM heat-distortion temperature of 170° C and a notched Izod impact strength of 0.39 foot pounds per inch of notch.

B. The experiment described in A of this example was repeated using 50 parts of Example 3B polymer and 50 parts of polycarbonate. The resulting polymer mixture was found to have the following properties:

| | |
|---|---|
| ASTM heat-distortion temperature | 125° C |
| notched Izod impact strength | 1.61 foot pounds per inch of notch |

In comparison, the polycarbonate was found to have an ASTM heat-distortion temperature of 130° C and a notched Izod impact strength of 1.3 foot pounds per inch of notch.

C. The experiment in A of this example was repeated using 50 parts of the Example 3B polymer and 50 parts of polyindene. The resulting polymer mixture was found to have the following properties:

| | |
|---|---|
| ASTM heat-distortion temperature | 153° C |
| notched Izod impact strength | 0.3 foot pounds per inch of notch |

A compression molded film of this polymer mixture was found to be light, clear and flexible.

In comparison, polyindene itself had an ASTM heat-distortion temperature of 170° C and a notched Izod impact strength of less than 0.2 foot pounds per inch of notch. A compression molded film of polyindene was extremely brittle.

D. The experiment described in A of this example was repeated using 33 parts of Example 3B polymer and 67 parts of polystyrene. The resulting polymer mixture was found to have the following properties:

| | |
|---|---|
| ASTM heat-distortion temperature | 94° C |
| flexural strength | $8.0 \times 10^3$ psi |
| notched Izod impact strength | 0.36 foot pounds per inch of notch |

A compression molded film of this polymer mixture was very tough and flexible.

E. A repeat of D of this example using 50 parts of the Example 3B polymer and 50 parts of polystyrene gave a polymer having the following properties:

| | |
|---|---|
| ASTM heat-distortion temperature | 98° C |
| flexural strength | 6.06 × 10³ psi |
| notched Izod impact strength | 0.45 foot pounds per inch of notch |

A compression molded film of this polymer mixture was clear and very flexible.

In comparison, the polystyrene had an ASTM heat-distortion temperature of 86° C, a flexural strength of 4.53 × 10³ psi and a notched Izod impact strength of 0.10 foot pounds per inch of notch. A compression molded film of polystyrene was very brittle.

I claim:

1. The graft polymer composition resulting from the polymerization of (A) from 60 to 95% by weight of indene in the presence of from 5 to 40% by weight of (B) a chlorinated rubbery copolymer of from 95% to 99% by weight of isobutylene and from 1 to 5% by weight of isoprene.

2. The composition of claim 1 wherein (B) contains from 0.1 to 5% by weight of chlorine based on the weight of the rubber.

3. The process comprising polymerizing with a Lewis acid catalyst (A) from 60 to 95% by weight of indene in the presence of from 5 to 40% by weight of (B) a chlorinated rubbery copolymer of isobutylene and isoprene.

4. The process of claim 3 carried out in an organic solvent and in an inert atmosphere.

5. The process of claim 4 wherein the Lewis acid catalyst is a member selected from the group consisting of $AlR_xCl_{3-x}$ wherein R is $CH_3$, $C_2H_5$, $nC_3H_7$ or $i-C_3H_7$, and $x$ is 0–3, $TiCl_4$ or $BF_3$.

6. The process of claim 5 carried out at a temperature in the range of from $-50°$ C to $-80°$ C.

7. The process of claim 6 wherein the organic solvent is a mixture of methylene chloride and pentane.

8. The process of claim 7 wherein (B) is a copolymer of from 95 to 99% by weight of isobutylene and from 1 to 5% by weight of isoprene.

9. The process of claim 8 wherein (B) contains from 0.1 to 5% by weight of chlorine based on the weight of the rubber.

* * * * *